United States Patent
Tsai et al.

(10) Patent No.: US 8,294,804 B2
(45) Date of Patent: Oct. 23, 2012

(54) CAMERA CAPABLE OF REDUCING INTERFERENCE THEREIN AND A METHOD OF OPERATING THE SAME

(75) Inventors: Kun-Hsu Tsai, Taipei (TW); Chien-Fu Chen, Taipei (TW); Chih-Yuan Wang, Tao-Yuan (TW)

(73) Assignee: Ability Enterprise Co., Ltd., Taipei (TW)

( * ) Notice: Subject to any disclaimer, the term of this patent is extended or adjusted under 35 U.S.C. 154(b) by 149 days.

(21) Appl. No.: 12/831,083

(22) Filed: Jul. 6, 2010

(65) Prior Publication Data

US 2012/0008034 A1    Jan. 12, 2012

(51) Int. Cl.
*H04N 5/222* (2006.01)
*H04N 5/225* (2006.01)

(52) U.S. Cl. .................................. 348/333.01; 348/372
(58) Field of Classification Search .................. 348/373, 348/372, 333.1, 333.01, 294
See application file for complete search history.

(56) References Cited

U.S. PATENT DOCUMENTS

| | | | |
|---|---|---|---|
| 4,974,014 A * | 11/1990 | Teramoto et al. | 396/271 |
| 6,304,727 B1 * | 10/2001 | Funahashi | 396/84 |
| 6,473,122 B1 * | 10/2002 | Kanekal | 348/340 |
| 7,508,444 B1 * | 3/2009 | Napoli et al. | 348/372 |
| 2003/0025685 A1 * | 2/2003 | Shirasaki et al. | 345/204 |
| 2003/0117513 A1 * | 6/2003 | Anderson | 348/333.11 |
| 2005/0012813 A1 * | 1/2005 | Wu | 348/14.14 |
| 2006/0033831 A1 * | 2/2006 | Ejima et al. | 348/333.01 |
| 2006/0146160 A1 * | 7/2006 | Murakami et al. | 348/308 |
| 2008/0055437 A1 * | 3/2008 | Inoue et al. | 348/294 |

FOREIGN PATENT DOCUMENTS

JP        02-248170      *  1/1990

* cited by examiner

*Primary Examiner* — Hung Lam
(74) *Attorney, Agent, or Firm* — Stout, Uxa, Buyan & Mullins, LLP

(57) ABSTRACT

A method of operating a camera is disclosed. A shutter button is pressed to trigger capturing an image. Subsequently, a display-related signal is prevented from transferring to a display panel at least for a duration during which image data are being read out of an image sensor.

21 Claims, 3 Drawing Sheets

CAMERA CAPABLE OF REDUCING INTERFERENCE THEREIN AND A METHOD OF OPERATING THE SAME

BACKGROUND OF THE INVENTION

1. Field of the Invention

The present invention generally relates to a digital camera, and more particularly to a scheme of reducing interference among electronic circuits in the digital camera.

2. Description of Related Art

A digital camera consists of electronic circuits or systems, among which interference or crosstalk may occur to create an undesired effect in a circuit by another circuit, therefore reducing quality of a photographed picture. The interference is oftentimes caused by an undesired or unavoidable coupling from one circuit to another circuit. For example, a liquid crystal display (LCD) clock signal transferring in a flexible printed circuit (FPC) may interfere with readout image data (from a charge-coupled device (CCD)) transferring in another FPC via coupling of a bracket that supports the LCD, thereby causing slant stripes in a photographed picture. The interference becomes worse when the camera is made more compact and thinner. Such interference may be reduced by using shielding mechanism among the electronic circuits. However, the shielding mechanism adds weight, volume and cost of the camera.

For the reason that conventional cameras could not effectively solve such interference effects, a need has arisen to propose a novel camera that is devoid of interference effects such as the slant stripes.

SUMMARY OF THE INVENTION

In view of the foregoing, it is an object of the embodiment of the present invention to provide a camera that can substantially reduce interference between a display panel and an image sensor.

According to one embodiment, a shutter button is pressed to trigger capturing an image. Subsequently, a display-related signal is prevented from transferring to a display panel at least for a duration during which image data are being read out of an image sensor.

According to another embodiment, a camera includes, among other things, a main circuit board, a display panel, a display flexible circuit, an image sensor and an image sensor flexible circuit. Specifically, a processor is mounted on the main circuit board. The display flexible circuit is coupled between the display panel and the main circuit board for communicating at least a display-related signal between the display panel and the main circuit board. The image sensor flexible circuit is coupled between the image sensor and the main circuit board for communicating image data between the image sensor and the main circuit board. After a shutter button is pressed to trigger capturing an image, the processor controls to prevent the display-related signal from transferring to the display panel at least for a duration during which image data are being read out of the image sensor.

DETAILED DESCRIPTION OF THE INVENTION

Figure 1:
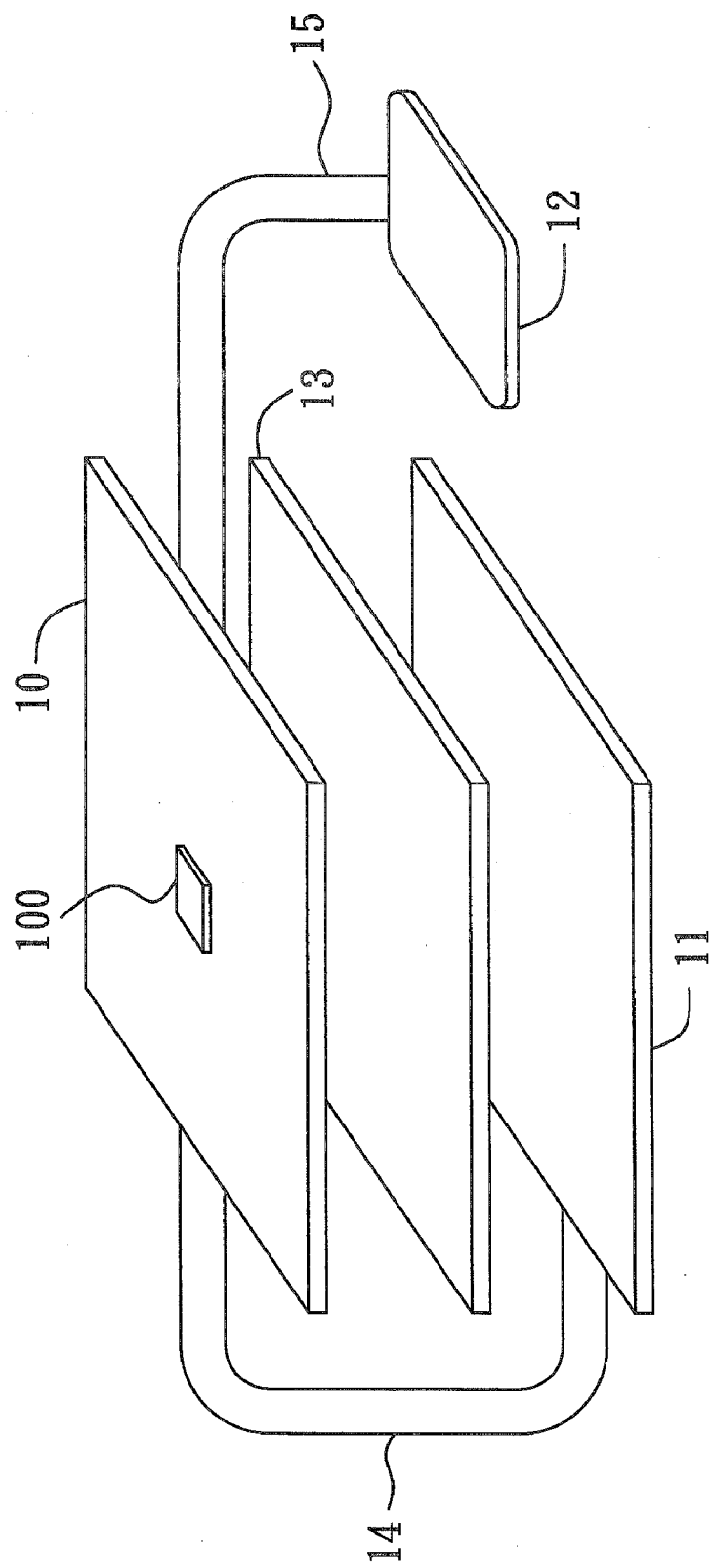
FIG. 1 shows a schematic diagram that illustrates composition of a camera according to one embodiment of the present invention.

FIG. 1 shows a schematic diagram illustrating composition of a camera according to one embodiment of the present invention. For illustration purposes, only elements pertinent to the embodiment are depicted. The camera includes a main circuit board 10, a display panel 11 and an image sensor 12. Specifically, the main circuit board 10 has a processor 100 such as a digital signal processor (DSP) mounted on the main circuit board 10. The display panel 11 such as a liquid crystal display (LCD) is supported by a bracket 13. The main circuit board 10 and the display panel 11 are usually disposed on the opposite sides of the bracket 13 respectively. A display flexible circuit 14 such as a flexible printed circuit (FPC) is coupled between the display panel 11 and the main circuit board 10 for communicating a display-related signal or signals between the display panel 11 and the main circuit board 10 (e.g., the processor 100). The display-related signal may be an LCD clock signal, and may further be an LCD data signal, an LCD horizontal synchronization signal (HSYNC) or an LCD vertical synchronization signal (VSYNC). An image sensor flexible circuit 15 such as a flexible printed circuit (FPC) is coupled between the image sensor 12 (such as a charge-coupled device (CCD)) and the main circuit board 10 for communicating image data between the image sensor 12 and the main circuit board 10 (e.g., the processor 100). It is appreciated that the composing elements of the camera may be arranged in a way other than that as described. Further, the camera may be attached to other appliance such as a cell phone or a personal digital assistant (PDA).

Figure 2:
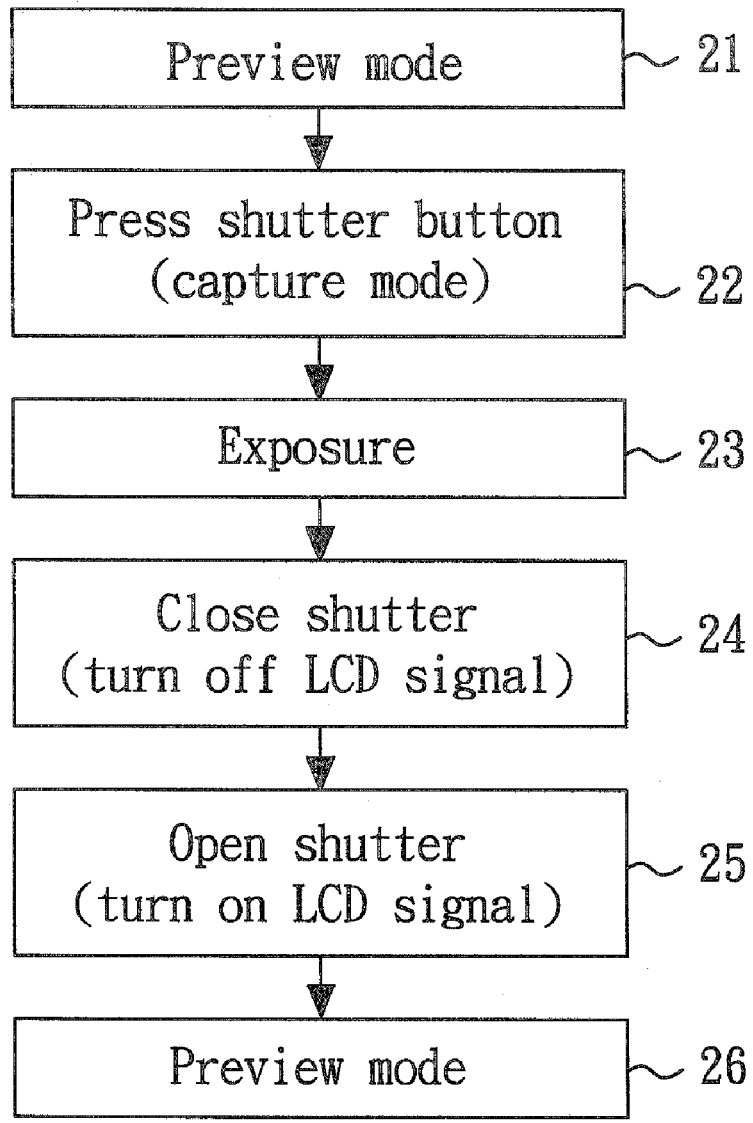
FIG. 2 shows a flow diagram that illustrates a method of operating a camera according to one embodiment of the present invention.
Figure 3:
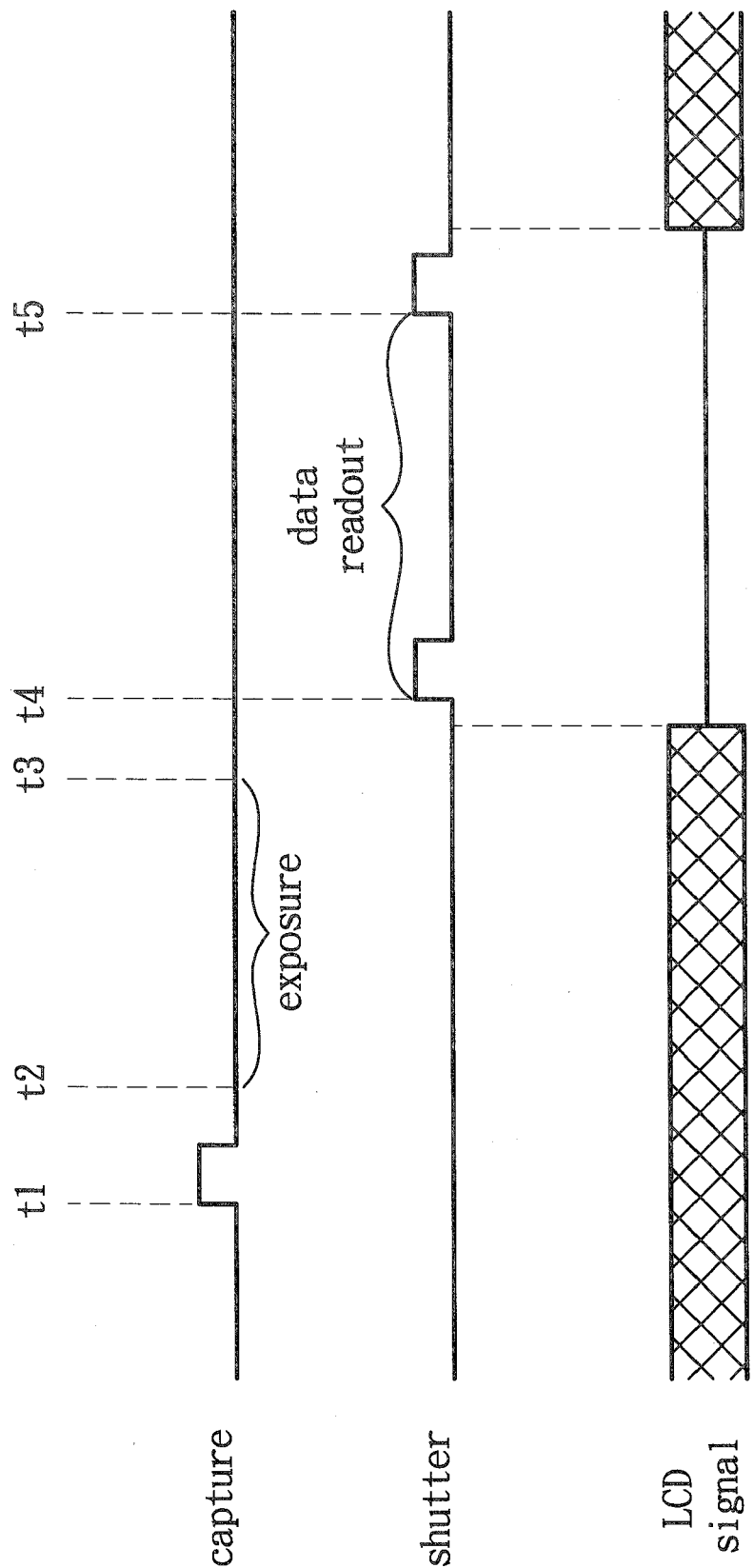
FIG. 3 shows exemplary waveforms of main signals of the camera in FIG. 1.

FIG. 2 shows a flow diagram that illustrates a method of operating a camera according to one embodiment of the present invention. FIG. 3 shows exemplary waveforms of main signals of the camera in FIG. 1. The flow (FIG. 2) of the embodiment may reduce or avoid signal interference on readout data of the image sensor 12 by LCD-related signal(s).

The camera is initially in a preview mode (step 21) until a shutter button is fully pressed (step 22) at time t1 (FIG. 3), therefore triggering to enter a capture mode. At the beginning of the capture mode, for example, in an exposure period (e.g., time t2-t3) (step 23), the image sensor 12 is exposed to light coming through a shutter of the camera. After the exposure, the shutter is closed at time t4 (step 24). A time period from shutter-close (at time t4) to shutter-open (at time t5, step 25) is main data-readout duration, during which image data are read out of the image sensor 12, for example, via the image sensor flexible circuit 15 (FIG. 1). The main data-readout duration is intended for reading out image data in the capture mode, and is distinguished from other data-readout durations that are intended for reading out image data in the preview mode.

According to one aspect of the embodiment, the LCD-related signal(s) are prevented (or blocked) from transferring to the display panel 11, thereby reducing or avoiding signal interference on the readout data of the image sensor 12 by the LCD-related signal(s). Specifically, in one embodiment, a control register of the processor 100 is configured, for example, by firmware, to turn off the LCD-related signal(s) at or prior to time t4. The control register of the processor 100 is configured to turn on again the LCD-related signal(s) at or after time t5. In another embodiment, a source of generating the LCD-related signal, e.g., an LCD clock generator, is turned off, for example, by firmware or circuit at or prior to time t4, and the source is turned on again at or after time t5. In a further embodiment, a backlight of the camera is turned off in the data-readout duration (e.g., t4-t5). Subsequently, after time t5, the preview mode is resumed (step 26).

According to the embodiment, the image data read out of the image sensor 12, in the data-readout duration, no longer suffers signal interference by the LCD-related signals, particularly the LCD clock signal. As the interference between the display panel 11 and the image sensor 12 is substantially reduced, the camera can be made more compact and thinner than ever.

Although specific embodiments have been illustrated and described, it will be appreciated by those skilled in the art that various modifications may be made without departing from the scope of the present invention, which is intended to be limited solely by the appended claims.

What is claimed is:

1. A method of operating a camera, comprising:
pressing a shutter button to trigger capturing an image; and
preventing a display-related signal from transferring to a display panel at least for a duration during which image data are being read out of an image sensor;
wherein the display panel is turned on while the image sensor is capturing the image, and the display panel stays turned on after reading the image data out of the image sensor is completed.

2. The method of claim 1, wherein the display panel is a liquid crystal display (LCD) panel.

3. The method of claim 2, wherein the display-related signal is an LCD clock signal.

4. The method of claim 2, wherein the display-related signal comprises one or more of following signals: an LCD clock signal, an LCD data signal, an LCD horizontal synchronization signal and an LCD vertical synchronization signal.

5. The method of claim 1, wherein the image sensor is a charge-coupled device (CCD).

6. The method of claim 1, wherein the display-related signal is prevented from transferring to the display panel for said duration by configuring a control register in a processor that controls transfer of the display-related signal.

7. The method of claim 1, wherein the display-related signal is prevented from transferring to the display panel for said duration by turning off a source of generating the display-related signal.

8. The method of claim 1, wherein said duration follows an exposure in which the image sensor is exposed to light coming through a shutter.

9. The method of claim 8, wherein said duration begins with the shutter closed and ends with the shutter opened.

10. The method of claim 1, further comprising a step of turning off a backlight of the camera for said duration.

11. A camera, comprising:
a main circuit board with a processor mounted thereon;
a display panel;
a display flexible circuit coupled between the display panel and the main circuit board for communicating at least a display-related signal between the display panel and the main circuit board;
an image sensor; and
an image sensor flexible circuit coupled between the image sensor and the main circuit board for communicating image data between the image sensor and the main circuit board;
wherein, after a shutter button is pressed to trigger capturing an image, the processor controls to prevent the display-related signal from transferring to the display panel at least for a duration during which image data are being read out of the image sensor;
wherein the display panel is turned on while the image sensor is capturing the image, and the display panel stays turned on after reading the image data out of the image sensor is completed.

12. The camera of claim 11, wherein the display panel is a liquid crystal display (LCD) panel.

13. The camera of claim 12, wherein the display-related signal is an LCD clock signal.

14. The camera of claim 12, wherein the display-related signal comprises one or more of following signals: an LCD clock signal, an LCD data signal, an LCD horizontal synchronization signal and an LCD vertical synchronization signal.

15. The camera of claim 11, wherein the image sensor is a charge-coupled device (CCD).

16. The camera of claim 11, wherein the processor comprises a control register that is configured to prevent the display-related signal from transferring to the display panel for said duration.

17. The camera of claim 11, wherein the processor turns off a source of generating the display-related signal for said duration.

18. The camera of claim 11, wherein said duration follows an exposure in which the image sensor is exposed to light coming through a shutter.

19. The camera of claim 18, wherein said duration begins with the shutter closed and ends with the shutter opened.

20. The camera of claim 11, wherein the processor further turns off a backlight of the camera for said duration.

21. The camera of claim 11, further comprising a bracket for supporting the display panel.

* * * * *